US007049436B2

(12) United States Patent
Gupta et al.

(10) Patent No.: US 7,049,436 B2
(45) Date of Patent: May 23, 2006

(54) CARBON DIOXIDE COMPATIBLE NON-AQUEOUS CROSSLINKED FRACTURING FLUIDS AND METHODS FOR THEIR USE

(75) Inventors: D. V. Satyanarayana Gupta, The Woodlands, TX (US); Greg Niechwiadowicz, Calgary (CA); Anita C Jerat, Calgary (CA)

(73) Assignee: BJ Services Company, Houston, TX (US)

( * ) Notice: Subject to any disclaimer, the term of this patent is extended or adjusted under 35 U.S.C. 154(b) by 0 days.

(21) Appl. No.: 10/267,686

(22) Filed: Oct. 9, 2002

(65) Prior Publication Data

US 2004/0072700 A1 Apr. 15, 2004

(51) Int. Cl.
*C09K 3/00* (2006.01)
(52) U.S. Cl. ............... 536/124; 536/123.1; 536/90; 536/95; 536/96; 536/84; 536/85; 507/213; 507/200; 507/100; 166/170; 166/294; 166/295; 424/659; 424/660; 514/839; 514/54
(58) Field of Classification Search ............ 536/90, 536/95, 96, 84, 85, 124, 123.1; 507/200, 507/100, 213; 166/170, 294, 295; 424/659, 424/660; 514/839, 54
See application file for complete search history.

(56) References Cited

U.S. PATENT DOCUMENTS 3,723,408 A 3/1973 Nordgren et al.
4,885,103 A * 12/1989 Putzig et al. ............... 507/203
4,899,819 A * 2/1990 Hazlett et al. ............. 166/285
5,256,651 A * 10/1993 Phelps et al. ................ 514/53
6,387,853 B1* 5/2002 Dawson et al. ............. 507/211

OTHER PUBLICATIONS

Malone, "Fracturing with crosslinked methanol in water-sensitive formations," Society of Petroleum Engineers(SPE 70009), 200 pp. 1-7.*
SPE 35577- Society of Petroleum Engineers (SPF 1996) "*Low Permiability Gas Reservoirs: Problems, Opportunities and Solutions for Drilling, Completion, Stimulation and Production*" —D.B. Bennion, F.B. Thomas, R.F. Bietz, Hycal Emergy Research Laboratories, Ltd.
SPE 27007—Society of Petroleum Engineers (SPF 1994); "*Methanol as Fracture Fluid in Gas Wells;*" J.M. Hernandez, C.T. Fernandez, N.M. Scianca, Pluspetrol S.A.
SPE 13565—Society of Petroleum Engineers (SPF 1985); "*Foaming of Anhydrous Methanol for Well Stimulation;*" S.C. Crema, BASF Wyandotte Co., and R.R. Alm, 3M Co.
SPE 14656—Society of Petroleum Engineers (SPF 1986); "*Effective Well Stimulations with Gelled Methanol/Carbon Dioxide Fracturing Fluids;*" C.M. Fairless and W. Joseph, Service Fracturing Co.

(Continued)

*Primary Examiner*—James O. Wilson
*Assistant Examiner*—Devesh Khare
(74) *Attorney, Agent, or Firm*—Howrey LLP

(57) ABSTRACT

Alcohol based hydraulic fracturing fluids useful for treating oil and gas wells are disclosed. The fluids are compatible with carbon dioxide, and comprise an alcohol, a polymer, a crosslinking agent, and a breaker. Hydroxypropyl guar with a molar substitution of about 1.2 to about 2.2 is identified as a presently preferred polymer.

16 Claims, 18 Drawing Sheets

OTHER PUBLICATIONS

SPE 70009—Society of Petroleum Engineers (SPF 2001) "*Fracturing with Crosslinked Methanol in Water-Sensitive Formations;*" Mark R. Malone, SPE, BJ Services Company, U.S.A.

The Petroleum Society, 1996; "*Remediation of Water and Hydrocarbon Phase Trapping Problems in Low Permeability Gas Reservoirs;*" B.D. Bennion, F.B. Thomas, R.F. Bietz, D.W. Bennion, Hycal Energy Research Laboratories, Ltd.

SPE 4790—Society of Petroleum Engineers of AIME; "*Developments in Fluids to Reduce Potential Damage from Fracturing Treatments;*" R.L. Tiner; E.J. Stahl, Jr., Member AIME; W.T. Malone, Member AIME, Halliburton Services, 1974.

The Journal of Canadian Petroleum Technology, Dec. 1996, vol. 35, No. 10; "*Water and Hydrocarbon Phase Trapping in Porous Media-Diagnosis, Prevention and Treatment*".

SPE 22800—Society of Petroleum Engineers, 1992; "*New Continuous-Mix Process for Gelling Anhydrous Methanol Minimizes Hazards;*" J.E. Thompson, Jr., SPE, BJ Services, Cam McBAin, SPE, Union Pacific Resources Inc., and Garth Gregory and Doug Gerbrandt, BJ Services.

* cited by examiner

CARBON DIOXIDE COMPATIBLE NON-AQUEOUS CROSSLINKED FRACTURING FLUIDS AND METHODS FOR THEIR USE

FIELD OF THE INVENTION

The invention relates to hydraulic fracturing fluids and, more specifically, to non-aqueous fracturing fluids. In particular, fluids comprising an alcohol, a polymer, a crosslinking agent, and a breaker are disclosed. The fluids are useful for fracturing water sensitive formations and for removing damage from oil and gas wells.

BACKGROUND OF THE INVENTION

Hydraulic fracturing fluids have been used widely in the stimulation of oil and gas wells. Proppant transport and retained conductivity are important qualities of fracturing fluids. The fluids are typically viscosified with a natural or synthetic polymer to improve the ability of the fluids to transport proppant materials. Water or hydrocarbons have been commonly used as base fluids for fracturing. While usually effective, water-based fluids can be harmful to certain types of formations, and are not effective at removing excess water from a well (removing "water blocks").

It is preferable that a fracturing fluid be compatible with carbon dioxide or other gasses. As used herein, the fluid or the polymer therein is "compatible" if it does not form a precipitate upon contact with the gas. Addition of carbon dioxide to a fracturing fluid provides gas pressure to assist in returning fluids to the wellbore after treatment.

The use of alcohols as base fluids has been previously suggested. Advantages of alcohols over water-based fluids include low freezing points, low surface tensions, high water solubilities, high vapor pressures, and good compatibility with formations. Alcohols have several potential safety issues relating to their low flash points, high vapor densities, and invisibility of flame. These safety issues can be properly addressed by skilled operators to minimize any associated risks.

Methanol foams have been prepared using synthetic polymers (polyacrylamide and polyethylene oxide). Attempts were made to crosslink the gelled methanol using metal crosslinkers. These include the use of titanium crosslinked fluids marketed by several service companies (for example, Methofrac 3 by Fracmaster, Ltd. (acquired by BJ Service Company) and Methofrac XL by BJ Services Company). These typically contained several percent of water, either for gelling and/or for breaking the gels. The titanium crosslinked polymers in the fluids did not break completely without the water and also did not perform well at temperatures greater than 90° C. Without water, this polymer system was not compatible with carbon dioxide.

A modified guar polymer was reported to dissolve in anhydrous methanol and crosslinked with a borate complexor. The complex was broken with an oxidizing breaker. This polymer as well as the borate crosslinker were not compatible with carbon dioxide (i.e. formed a precipitate and the borate crosslink was reversed).

SPE 13565 (S. C. Crema and R. R. Alm, 1985; presented at the International Symposium on Oilfield and Geothermal Chemistry, Phoenix, Ariz., Apr. 9–11, 1985) describes the preparation of foamed anhydrous methanol. The foamed material is offered for the stimulation of water sensitive formations. The foams contain a fluorosurfactant and a foam extender. The foam extender allows a reduction in the amount of fluorosurfactant needed. Example foam extenders include oxyalkylated fatty alcohols and amines or polyethers containing ethylene and propylene oxide units. Foamed fluids have limited viscosity, and as a result, their practical application is limited.

SPE 14656 (C. M. Fairless and W. Joseph, 1986; prepared for presentation at the East Texas Regional Meeting of the Society of Petroleum Engineers, Tyler, Tex., Apr. 21–22, 1986) describes the use of a two-phase structured system for the treatment of wells. Vaporized carbon dioxide is dispersed as an internal phase in a gelled complexed methanol external phase to produce a foam. The foams were used to treat water sensitive formations.

SPE 22800 (J. E. Thompson et al., July 1992) suggests a continuous mix process for gelling anhydrous methanol. The continuous mix process is suggested as a less risky alternative to batch processing. Additionally, the continuous process achieved full fluid viscosity in a reduced amount of time, and the performance of the produced materials was similar.

SPE 27007 (J. M Hernandez et al., 1994; prepared for presentation at the Latin American/Caribbean Petroleum Engineering Conference, Buenos Aires, Argentina, Apr. 27–29, 1994) presents a comparison of methanol and other fluids as fracture fluids in gas wells. Methanol was shown to provide additional stimulation near the fracture faces, decrease the saturation of water in the zone, and increased the gas permeability of the formation SPE 35577 (D. B. Bennion, et al., 1996; prepared for presentation at the Gas Technology Conference, Calgary, Alberta, Canada, Apr. 29–May 1, 1996) offers a review of efforts taken to obtain natural gas in low permeability sandstone and carbonate formations. Methanol is suggested as being able to significantly reduce interfacial tension between water-gas or oil-gas systems.

SPE 70009 (Mark R. Malone, 2001; prepared for presentation at the SPE Permian Basin Oil and Gas Recovery Conference, Midland, Tex., May 15–16, 2001) describes the use of crosslinked methanol fracturing fluids in water-sensitive formations. A crosslinked methanol system was prepared using hydroxypropyl guar, encapsulated ammonium persulfate breaker, and liquid carbon dioxide. Case histories were described using the fracturing fluids in test wells.

Despite the reported art, there exists a need for non-aqueous fracturing fluids that are compatible with carbon dioxide.

SUMMARY OF THE INVENTION

Crosslinked polymer compositions are disclosed that are compatible with carbon dioxide. The compositions can be used as hydraulic fracturing fluids for oil or gas wells. The compositions can comprise a polymer, an alcohol solvent, a crosslinker, and a breaker. The polymers are soluble both in water and in the alcohol solvent. The use of hydroxypropyl guar with a molar substitution of about 1.2 to about 2.2 in such a composition has been demonstrated.

DESCRIPTION OF THE FIGURES

The following figures form part of the present specification and are included to further demonstrate certain aspects of the present invention. The invention may be better understood by reference to one or more of these figures in combination with the detailed description of specific embodiments presented herein.

| FIG. | Description |
|------|-------------|
| 1 | Viscosity vs. temperature plot for crosslinked gels pressurized with nitrogen. |
| 2 | Viscosity vs. temperature plot for crosslinked gels pressurized with carbon dioxide. |
| 3 | Low temperature rheology plots for crosslinked gel with nitrogen. |
| 4 | Mid temperature rheology plots for crosslinked gel with nitrogen. |
| 5 | High temperature rheology plots for crosslinked gel with nitrogen. |
| 6 | Low temperature rheology plots for crosslinked gel with carbon dioxide. |
| 7 | Mid temperature rheology plots for crosslinked gel with carbon dioxide. |
| 8 | High temperature rheology plots for crosslinked gel with carbon dioxide. |

DETAILED DESCRIPTION OF THE INVENTION

Figure 1:
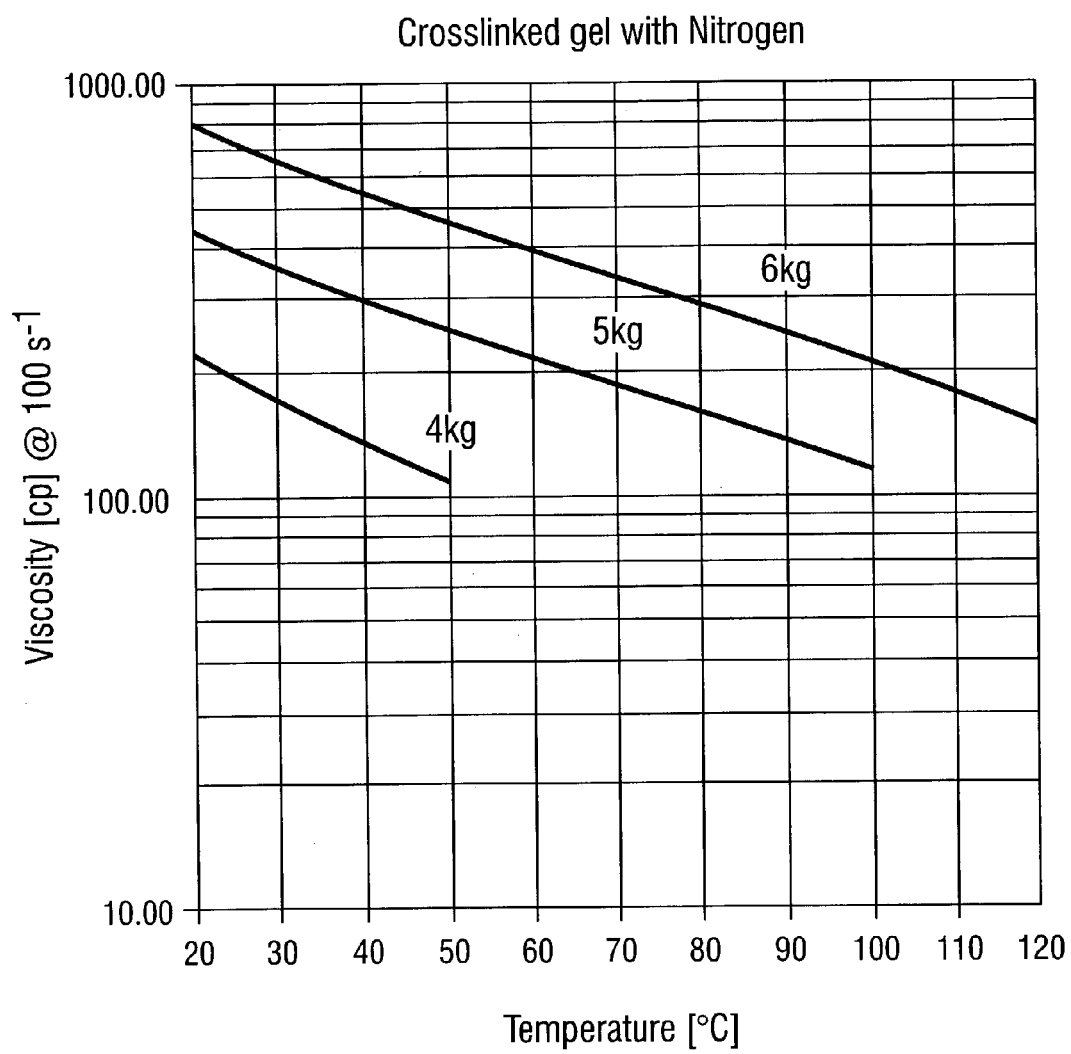

The invention is generally directed towards carbon dioxide compatible fluid compositions and methods for their use. The compositions are attractive for their use as hydraulic fracturing fluids, and for removing water from downhole formations.

Compositions

One embodiment of the invention is directed towards a composition comprising a polomer, an alcohol solvent, a crosslinker, and a breaker; wherein: the polymer is soluble in water, the polymer is soluble in the alcohol solvent, and the polymer is soluble in the composition in the presence of carbon dioxide.

The polymer can generally be any polymer compatible with carbon dioxide. As used herein, a polymer is "compatible" with carbon dioxide if it remains soluble in the composition in the presence of dissolved or liquid carbon dioxide. It is preferred that the polomer is soluble in water, the alcohol solvent, and mixtures of water and the alcohol solvent. It is presently preferred that the polymer have a hydroxyl, carboxyl, or other group available for crosslinking. Example polymers include hydroxypropyl guar, hydroxypropyl cellulose, hydroxyethyl guar, hydroxybutyl guar, and carboxymethylhydroxypropyl guar. The polymer is preferably soluble in alcohol and compatible with carbon dioxide. A presently preferred polymer is hydroxypropyl guar polymer with a molar substitution of about 1.2 to about 2.2. For example, the molar substitution can be about 1.2, about 1.3, about 1.4, about 1.5, about 1.6, about 1.7, about 1.8, about 1.9, about 2.0, about 2.1, about 2.2, or ranges between any two of these values. As used herein, molar substitution is the number of moles of hydroxypropyl groups per mole of polymer.

The alcohol solvent can generally be any alcohol solvent in which the polymer can dissolve. It is advantageous if water is soluble in the alcohol. Example alcohol solvents include methanol, ethanol, 2-propanol (isopropyl alcohol), 1-butanol, and 2-butanol.

The composition can comprise water in addition to the alcohol solvent. The water can generally be any amount of water. It is presently preferred that the amount of water in the composition is about 50 weight percent or less, about 25 weight percent or less, about 5 weight percent or less, or about 2 weight percent or less. Commercially available alcohols typically contain several percent of water (e.g. commercial methanol typically contains 2 percent water). If a composition is to be used to remove water from a downhole formation, it is preferred that the amount of water in the composition be minimized.

The composition can further comprise nitrogen ($N_2$) or carbon dioxide ($CO_2$). The nitrogen or carbon dioxide can be present as a gas, as a liquid, or as a supercritical fluid. Typically, under hydraulic fracturing conditions, nitrogen is a gas and carbon dioxide exists either as a liquid or as a supercritical fluid.

The crosslinker can generally be any crosslinker functional to crosslink the polymer. For example, the crosslinker can be a zirconium salt crosslinker or a titanium salt crosslinker, such as oxychloride, acetate, tetrachloride, O-sulfate or carbonate, or chelated titanium or zirconium compounds, for example with lactate, citrate, triethanolamine, hydroxyethyl glycine or any titanium or zirconium oxides such as zirconium isopropoxide or zirconium isobutoxide. The crosslinkers include any zirconium salt or titanium salt soluble in alcohol or chelated zirconium or titanium compound, generally known in the industry. It is preferred that the crosslinker be soluble in alcohol so as not to introduce another solvent, such as water to make the system non-aqueous.

The breaker can generally be any breaker functional to degrade the polymer under downhole conditions. The breaker can generally be any oxidizing agent or encapsulated oxidizing agent. For example, the breaker can be a percarbonate, a perchlorate, a peracid, a peroxide, or a persulfate. The breaker can be encapsulated or unencapsulated. As an alternative to encapsulation, a low solubility breaker can be used. Specific examples of breakers include sodium persulfate and encapsulated potassium persulfate.

The compositions can further comprise a proppant. The proppant can generally be any proppant, such as sand, ceramic particles, or resin coated particles.

Methods of use

The above described compositions can be used as hydraulic fluids in oil or gas wells. Due to the possibility of precipitation, their use in oil wells containing asphaltene or paraffin wax is less desirable.

Accordingly, an additional embodiment of the invention is directed towards methods of treating a downhole well formation, the method comprising providing a composition comprising hydroxypropyl guar polymer with a molar substitution of about 1.2 to about 2.2, an alcohol solvent, a zirconium crosslinker or titanium crosslinker, and a breaker; pumping the composition into a wellbore; and contacting the composition and the formation.

The providing step can involve obtaining the composition in a prepared condition, or can involve obtaining the component ingredients and preparing the composition on site.

The composition can further comprise any of the materials discussed above, such as nitrogen, carbon dioxide, or water. The alcohol solvent can be any of the alcohol solvents discussed above, such as methanol, ethanol, 2-propanol, 1-butanol, or 2-butanol. The breaker can be any of the breakers discussed above, such as a percarbonate, a perchlorate, a peracid, a peroxide, sodium persulfate, or encapsulated potassium persulfate.

The method can further comprise removing the composition from the formation after the contacting step. This removing step can be aided by gas pressure caused by the carbon dioxide or nitrogen. The contacting and removing steps can remove water from the formation. For effective removal of water from the formation, it is preferred that the composition have reduced levels of water (if any). The contacting step preferably dissolves polymer materials that were present in the formation. The removed composition could be recovered/recycled, or could be disposed of according to industry standard practices.

The removing step can be performed at any time after the contacting step. For example, the contacting step can be performed for a sufficient time for dissolving polymers and removing water, followed by the removing step. Alternatively, the well can be "shut in", where the contacting step is performed for a prolonged period of time. The length of time can be as short as immediate flow back or for up to several days (e.g. 2 or 3 days) shut in.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLES

Example 1

Crosslinker Evaluation Method

The following assay was used to evaluate crosslinkers for their use in non-aqueous systems. Polymer and hydration buffer were mixed with non-aqueous methanol in a blender for approximately 30 minutes to solvate the base polymer. The buffer and crosslinker were added, and the vortex closure time was measured. The crosslinked gel was then placed on a Brookfield PVS high pressure, high temperature viscometer and tested at low, middle, and high temperature range while pressurized with either nitrogen or carbon dioxide.

Example 2

Compatibility with Carbon Dioxide Evaluation Method

Crosslinked gels were placed on a Brookfield PVS Viscometer, pressurized with carbon dioxide, and tested at the same temperature ranges as in Example 1. The pressure of carbon dioxide exceeded the vapor pressure of methanol at any given temperature.

The gel was also tested in a high pressure cell with carbon dioxide. The crosslinked gel (30 ml) was injected into the cell, and next an equal volume of liquid carbon dioxide was added under 600 psi (42 kg/cm$^2$) pressure. The solubility of the crosslinked gel in the presence of carbon dioxide was determined by visual observation for the formation of precipitate, or lack thereof.

Example 3

Breaker Evaluation Method

The following assay was used to evaluate breakers for their use in non-aqueous systems. Crosslinked gels were tested on a Brookfield PVS high pressure, high temperature viscometer, with the breaker added directly into the measuring cup. Tests were performed with the cup pressurized with either nitrogen or carbon dioxide at a given pressure. A useable breaker preferably allows a minimum viscosity (this depends on the frac treatment performed and is determined by well and formation condition (typically about 80 cP) for the pumping time of treatment, and then reducing the viscosity to less than about 10 cP.

Example 4

Preparation of Hydroxypropyl Guar Polymer

The preparation of a wide array of guar (polygalactomannan) derivatives are described in the scientific literature and in issued patents. For example, U.S. Pat. Nos. 3,723,408; 3.723,409; 4,169,945; 4,276,414; 4,094,795; 3,346,555; 3,303,184; 3,255,028; and 4,031,306 detail the synthesis of derivatives such as allyl ether, aminoethyl, acrylamide, dialkylacrylamide ether, zwitterion, alkyl ether, carboxyalkyl hydroxyalkyl, and hydroxyalkyl ether derivatives. The preparation of hydroxypropyl guar is described in U.S. Pat. No. 3,723,408. Guar is reacted with propylene oxide in the presence of base to prepare hydroxypropyl guar. By varying the molar ratio of propylene oxide to guar, polymers of different molar substitution can be obtained.

Example 5

Evaluation of Polymer Molar Substitutions

Twenty nine samples of hydroxypropyl guar having varying degrees of molar substitution were evaluated for their solubility in 100% methanol, and for their compatibility with carbon dioxide (i.e. solubility in the presence of carbon dioxide). For both assays, a gel was prepared at a concentration of 7 kg polymer per cubic meter of 100% methanol. A polymer is considered soluble if it forms a clear gel after 30 minutes of mixing at room temperature. Compatibility with carbon dioxide was determined according to Example 2.

| Sample # | Batch # | M.S. | solubility | compatibility w/ CO2 |
| --- | --- | --- | --- | --- |
| 01-0588 | L1129423 | 1.1 | NO | |
| 02-0013 | 01-005-1wash | 1.1 | NO | |
| 02-0014 | 01-005-2wash | 1.15 | YES | NO |
| 02-0194 | HPG-02-004-1X | 1.15 | NO | |
| 02-0335 | L0621272 | 1.15 | NO | |
| 01-0088 | 103802 | 1.2 | YES | YES |
| 01-0589 | L1130427 | 1.2 | YES | YES |
| 01-0590 | L1130428 | 1.2 | YES | YES |
| 01-0607 | L1213455 | 1.2 | YES | YES |
| 02-0099 | L0225096 | 1.2 | YES | YES |
| 02-0100 | L0225097 | 1.2 | YES | YES |
| 02-0068 | L0213083 | 1.2 | YES | YES |
| 02-0193 | HPG-02-004-2X | 1.2 | YES | YES |
| 02-0209 | L0422180 | 1.2 | YES | YES |
| 02-0367 | L0716304 | 1.2 | YES | YES |
| 02-0368 | L0716303 | 1.2 | YES | YES |
| 02-0381 | | 1.2 | YES | YES |
| 02-0382 | | 1.2 | YES | YES |
| 02-0405 | L0807344 | 1.2 | YES | YES |
| 02-0406 | L0807345 | 1.2 | YES | YES |
| 02-0197 | HPG-02-001-2X | 1.41 | YES | YES |
| 02-0198 | HPG-02-002-2X | 1.41 | YES | YES |
| 02-0192 | HPG-02-001-1X | 1.43 | YES | YES |
| 02-0195 | HPG-02-003-1X | 1.58 | YES | YES |
| 02-0196 | HPG-02-003-2X | 1.64 | YES | YES |
| 01-0541 | HPG-01004A | 2.19 | YES | YES |
| 01-0540 | HPG-01003A | 2.2 | YES | YES |
| 01-0540a | HPG-01003B | 2.3 | YES | NO |
| 01-0542 | HPG-01004B | 2.3 | YES | NO |

Hydroxypropyl guar polymers having a molar substitution of 1.2 to 2.2 were observed to both be soluble in 100% methanol and be compatible with carbon dioxide. Polymers with lower molar substitutions tended to not be soluble in methanol, while polymers with higher molar substitutions were not compatible with carbon dioxide.

Example 6

Preparation of a Non-aqueous Formulation

A non-aqueous methanol (100%) formulation was prepared containing GM-60 (hydroxypropyl guar with a molar substitution of 0.12), Ferrotrol 100 hydration buffer (available from BJ Services Company, Tomball, Tex.), CXZ-2 crosslinker (alkanolamine chelated zirconium complex, described in U.S. Pat. No. 4,885,103), 85% formic acid buffer, and sodium persulfate or encapsulated potassium persulfate breaker.

The loading and surface crosslinking was determined as follows.

| Temperature °C. (° F.) | GM-60 loading in kg/m³ (lb/1000 gal) | CXZ-2 loading with $N_2$ in l/m³ (gal/1000 gal) | CXZ-2 loading with $CO_2$ in l/m³ (gal/1000 gal) | 85% FA loading in l/m³ (gal/1000 gal) | Vortex closure time (sec) |
|---|---|---|---|---|---|
| 20–30 (68–86) | 4.0 (33) | 0.8 (0.8) | 0.8 (0.8) | 4.0 (4.0) | 40 |
| 31–50 (87–122) | 4.0 (33) | 1.0 (1.0) | 0.8 (0.8) | 4.0 (4.0) | 40 |
| 51–70 (123–158) | 5.0 (42) | 1.0 (1.0) | 1.0 (1.0) | 4.0 (4.0) | 40 |
| 80 (176) | 6.0 (50) | 1.2 (1.2) | 1.2 (1.2) | 4.0 (4.0) | 32 |
| 100 (212) | 6.0 (50) | 1.75 (1.75) | 1.75 (1.75) | 4.0 (4.0) | 32 |
| 120 (248) | 7.0 (58) | 1.25 (1.25) | 1.25 (1.25) | 4.0 (4.0) | 30 |

Figure 2:
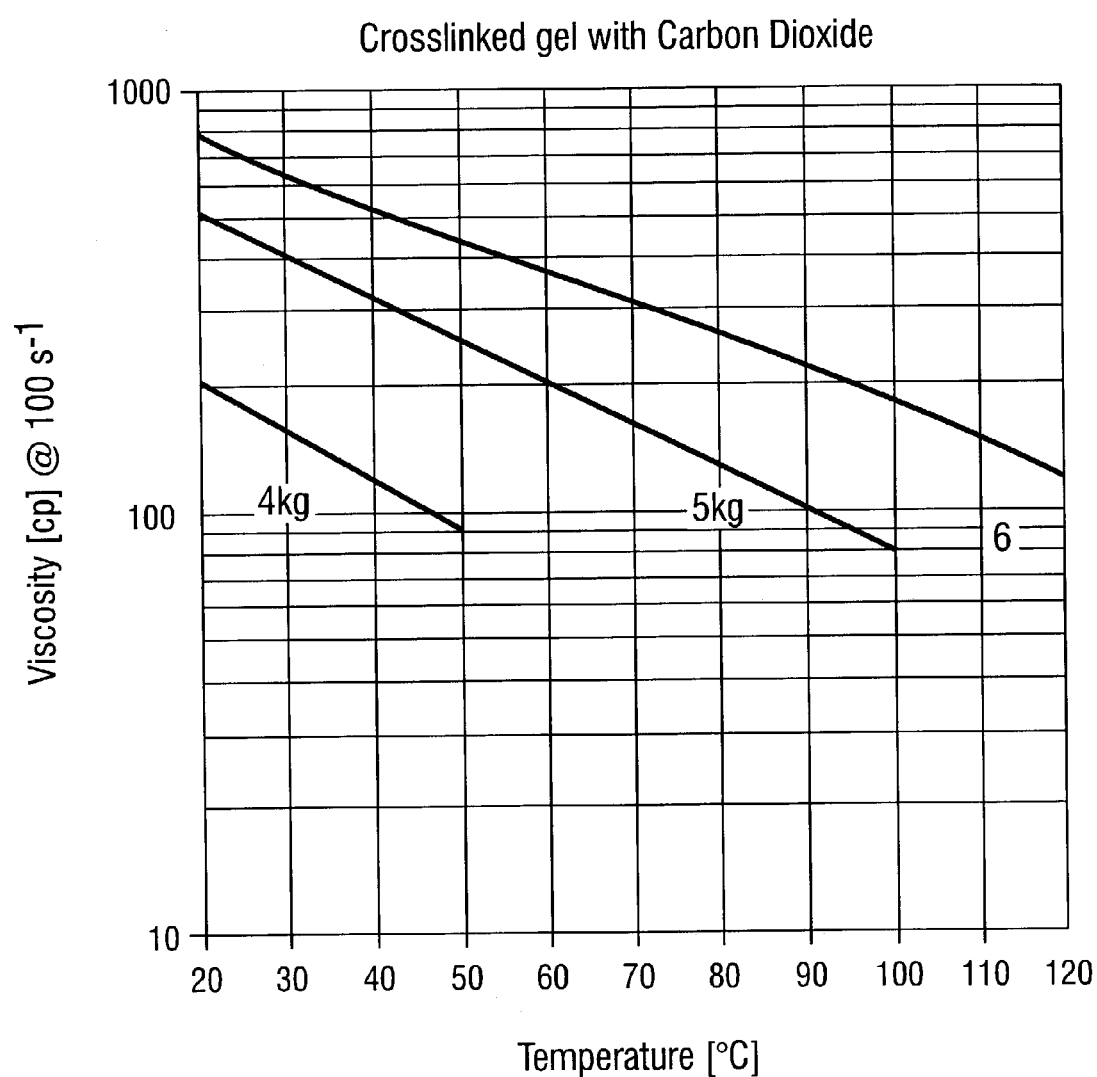

The compositions containing 4 kg/m³, 5 kg/m³, and 6 kg/m³ GM-60 were assayed for their viscosity over a range of temperatures in the presence of nitrogen (FIG. 1) or in the presence of carbon dioxide (FIG. 2). The figures show the initial viscosity at 100 sec$^{-1}$ of the zirconium crosslinked fluid at various temperatures. Assays were performed using a Brookfield high pressure high temperature PVS rheometer, pressurized with either nitrogen or carbon dioxide to prevent the methanol from evaporating.

It is generally considered that a minimum viscosity of about 80 cP is required for a fracturing operation. The data shows that the minimum required viscosity can be achieved with a base gel loading of 4 kg/m³ to 6 kg/m³ depending on temperature and well formation condition, i.e. the desired viscosity can be tailored.

Since carbon dioxide is soluble in methanol, the assays using pressurized carbon dioxide provide a means of evaluating the viscosity of the system in the presence of carbon dioxide and also a means to optimize the loadings of various additives in the presence of carbon dioxide. The data shows that at the various temperatures, the crosslinked viscosity can be adjusted with the different base gel loadings in the presence of carbon dioxide.

Example 7

Compatibility of Crosslinked Gels with Carbon Dioxide

The methanol formulation described in the previous Example containing GM-60 (hydroxypropyl guar with a molar substitution of 0.12), Ferrotrol 100 hydration buffer, CXZ-2 crosslinker, 85% formic acid buffer, and sodium persulfate or encapsulated potassium persulfate breaker was prepared. Initially, a small amount of precipitation was formed upon contact with carbon dioxide, but it dissolved with continuous addition of carbon dioxide. While the formulation had a cloudy visual appearance, no precipitation was observed.

A gel as described in SPE 37229 was prepared, but it formed a precipitate upon contact with carbon dioxide.

Example 8

Rheology Assays for Compositions with Nitrogen ($N_2$) Pressurization

FIGS. 3 through 5 show the viscosities when pressurized with nitrogen with various breakers designed to break the gels, and comparison of viscosities of gels without any breaker present. The formulations of the gels used are described in Example 6. Viscosities were measured using a Brookfield PVT high pressure high temperature rheometer at a continuous shear rate of 100 sec$^{-1}$.

Figure 3A:
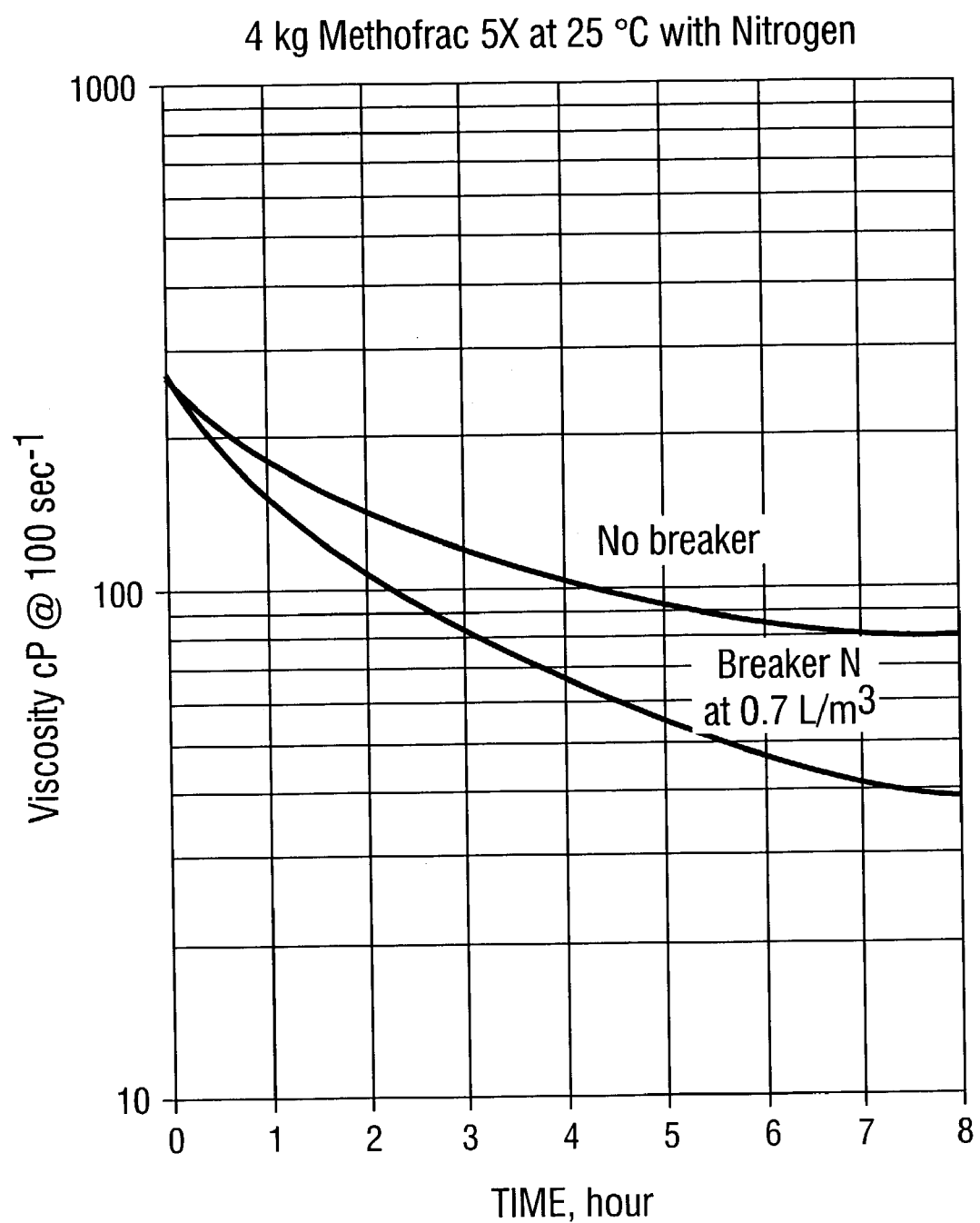

4 kg at 25° C. with Nitrogen (Viscosity, cP @ 100 sec$^{-1}$)(FIG. 3A)

| Time, hr | No Breaker | 0.7 kg/m³ BreakerN |
|---|---|---|
| 0 | 273 | 277 |
| 1 | 182 | 160 |
| 2 | 143 | 109 |
| 3 | 121 | 83 |
| 4 | 106 | 67 |
| 5 |  | 55 |
| 6 |  | 47 |
| 7 |  | 41 |
| 8 |  | 38 |

Figure 3B:
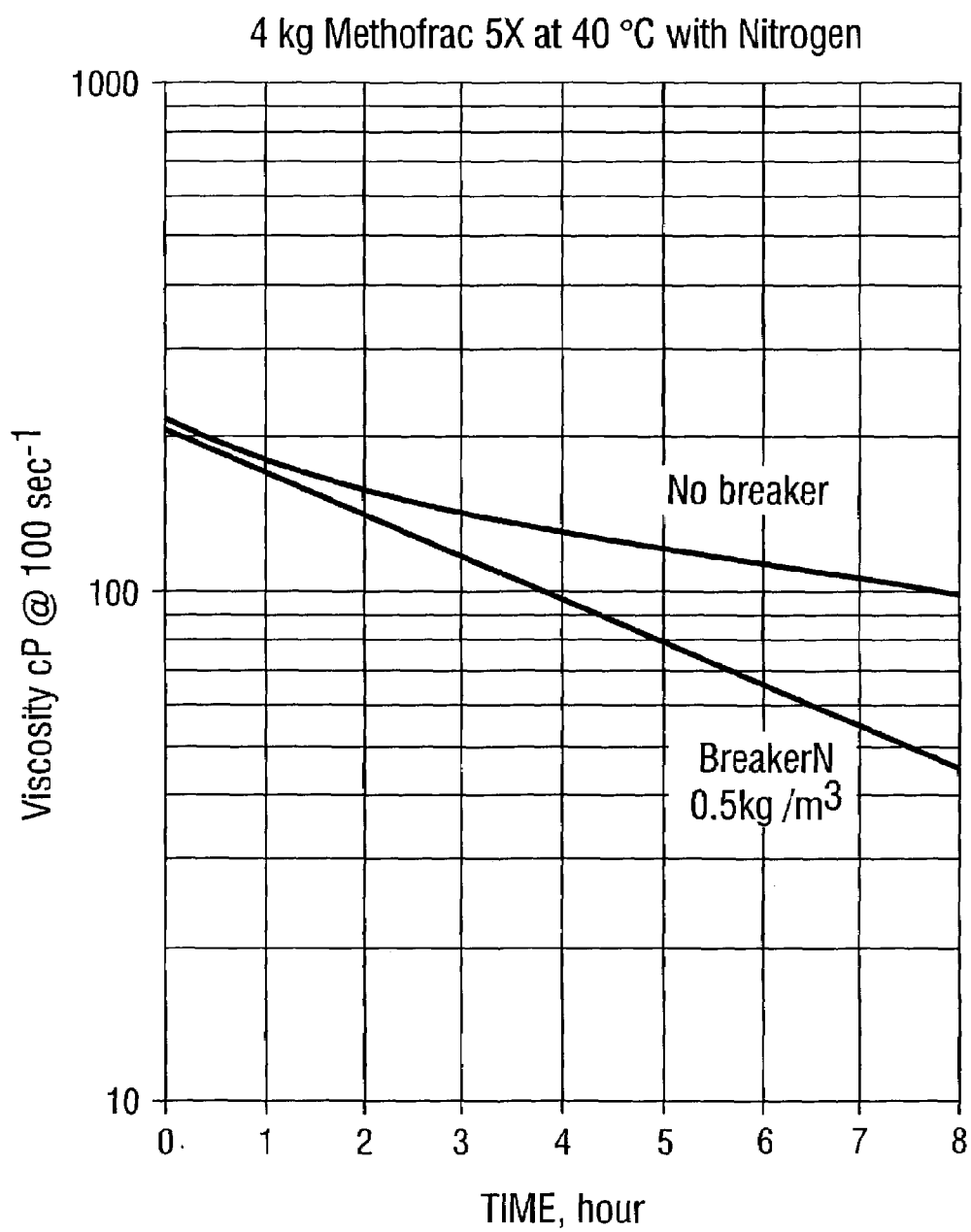

4 kg at 40° C. with Nitrogen (Viscosity, cP @ 100 sec$^{-1}$)(FIG. 3B)

| Time, hr | No Breaker | 0.5 kg/m³ BreakerN |
|---|---|---|
| 0 | 226 | 213 |
| 1 | 187 | 176 |
| 2 | 163 | 145 |
| 3 | 147 | 119 |
| 4 | 134 | 98 |
| 5 | 124 | 81 |
| 6 |  | 67 |
| 7 |  | 55 |
| 8 |  | 45 |

Figure 3C:
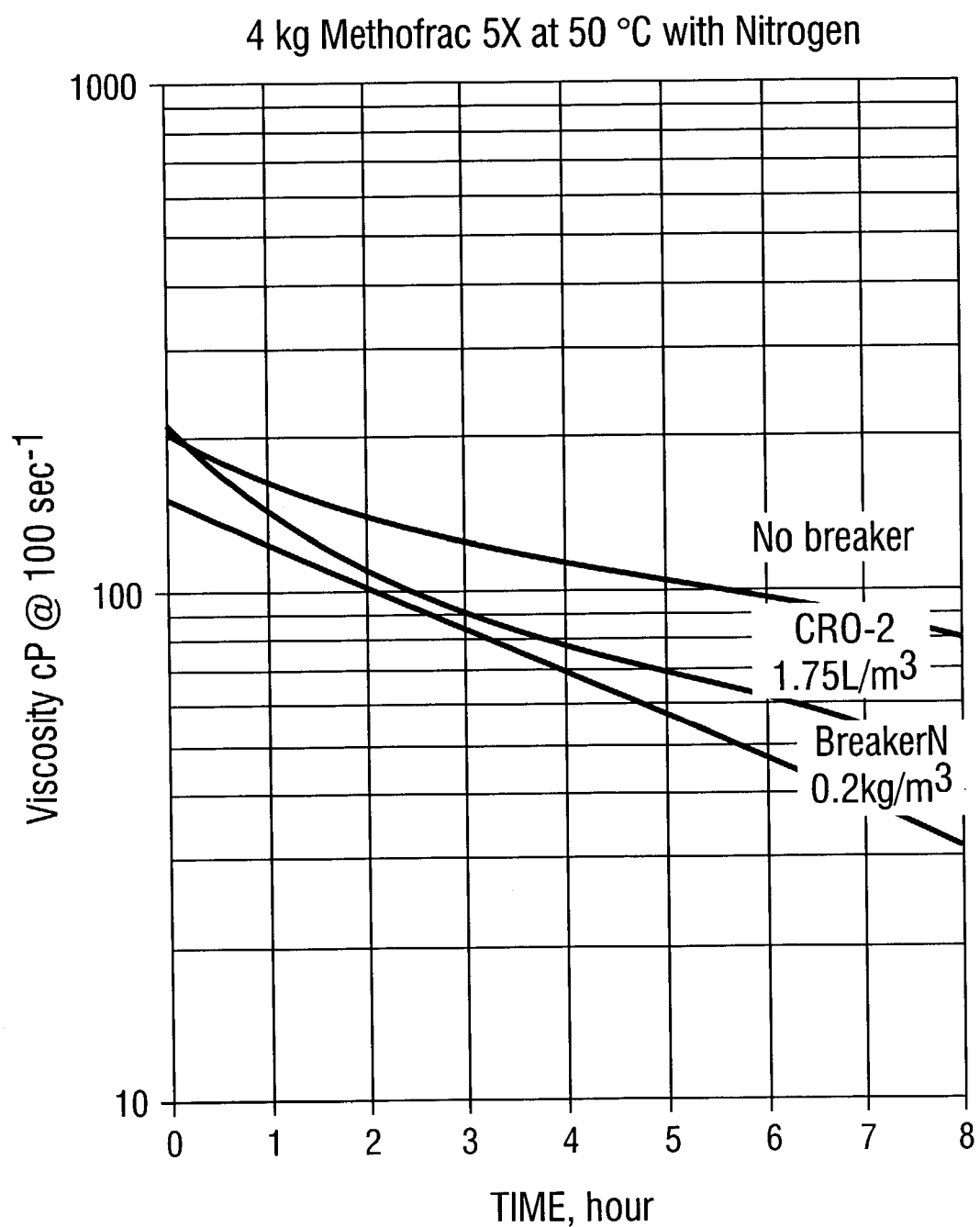

4 kg at 50° C. with Nitrogen (Viscosity, cP @ 100 sec$^{-1}$)(FIG. 3C)

| Time, hr | No breaker | 0.2 kg/m³ BreakerN | 1.75 l/m³ CRO-2 |
|---|---|---|---|
| 0 | 204 | 155 | 218 |
| 1 | 165 | 127 | 150 |
| 2 | 142 | 104 | 111 |
| 3 | 126 | 85 | 91 |
| 4 | 114 | 69 | 78 |
| 5 | 104 | 57 | 68 |
| 6 | 95 | 46 | 62 |
| 7 | 88 | 38 | 55 |
| 8 | 81 | 31 | 50 |

Figure 4A:
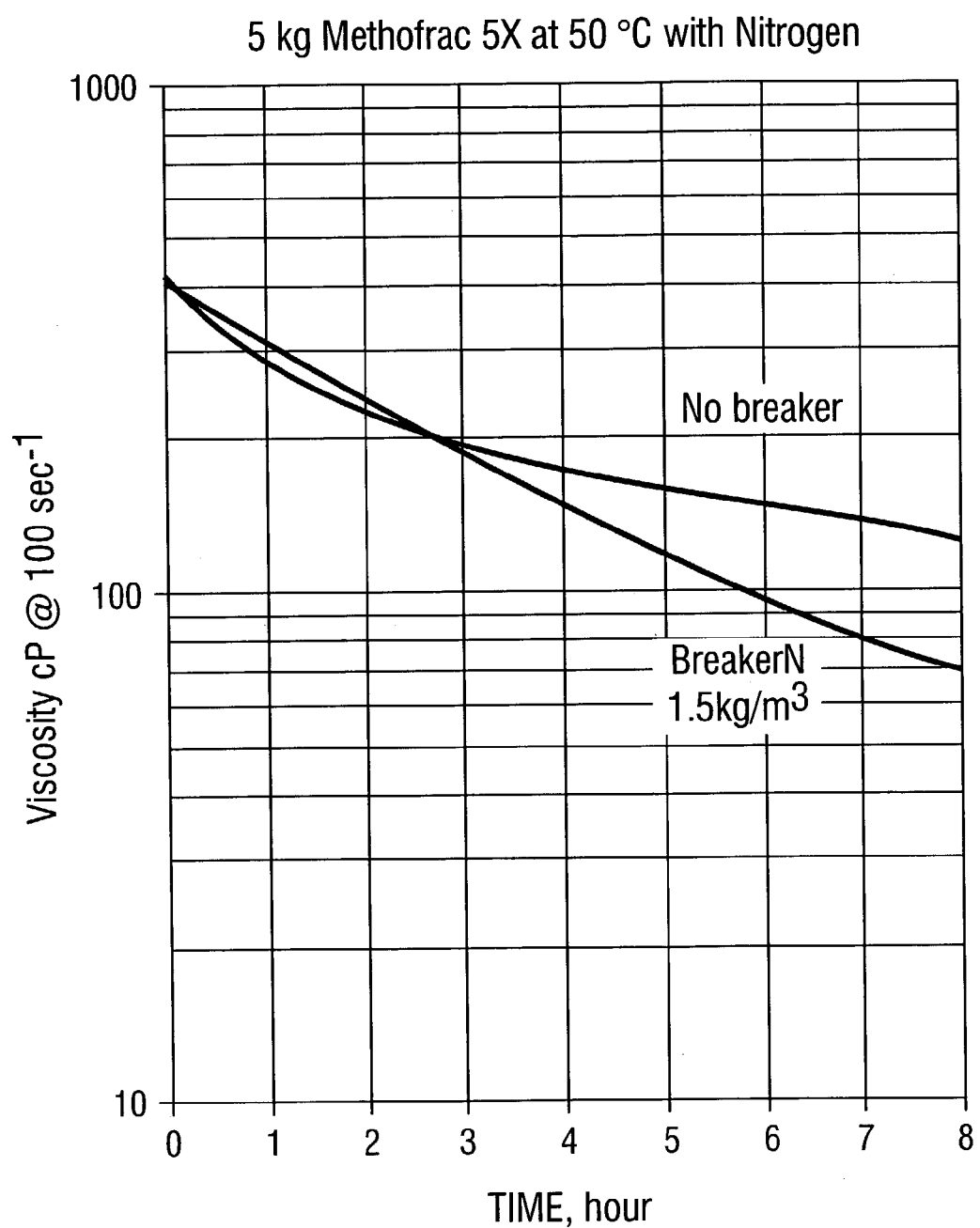

5 kg at 50° C. with Nitrogen (Viscosity, cP @ 100 sec$^{-1}$)(FIG. 4A)

| Time, hr | No Breaker | 0.5 kg/m³ BreakerN |
|---|---|---|
| 0 | 422 | 432 |
| 1 | 289 | 318 |
| 2 | 231 | 247 |
| 3 | 198 | 194 |
| 4 | 175 | 152 |
| 5 | 159 | 120 |
| 6 | 146 | 97 |
| 7 | 136 | 81 |
| 8 | 127 | 70 |

Figure 4B:
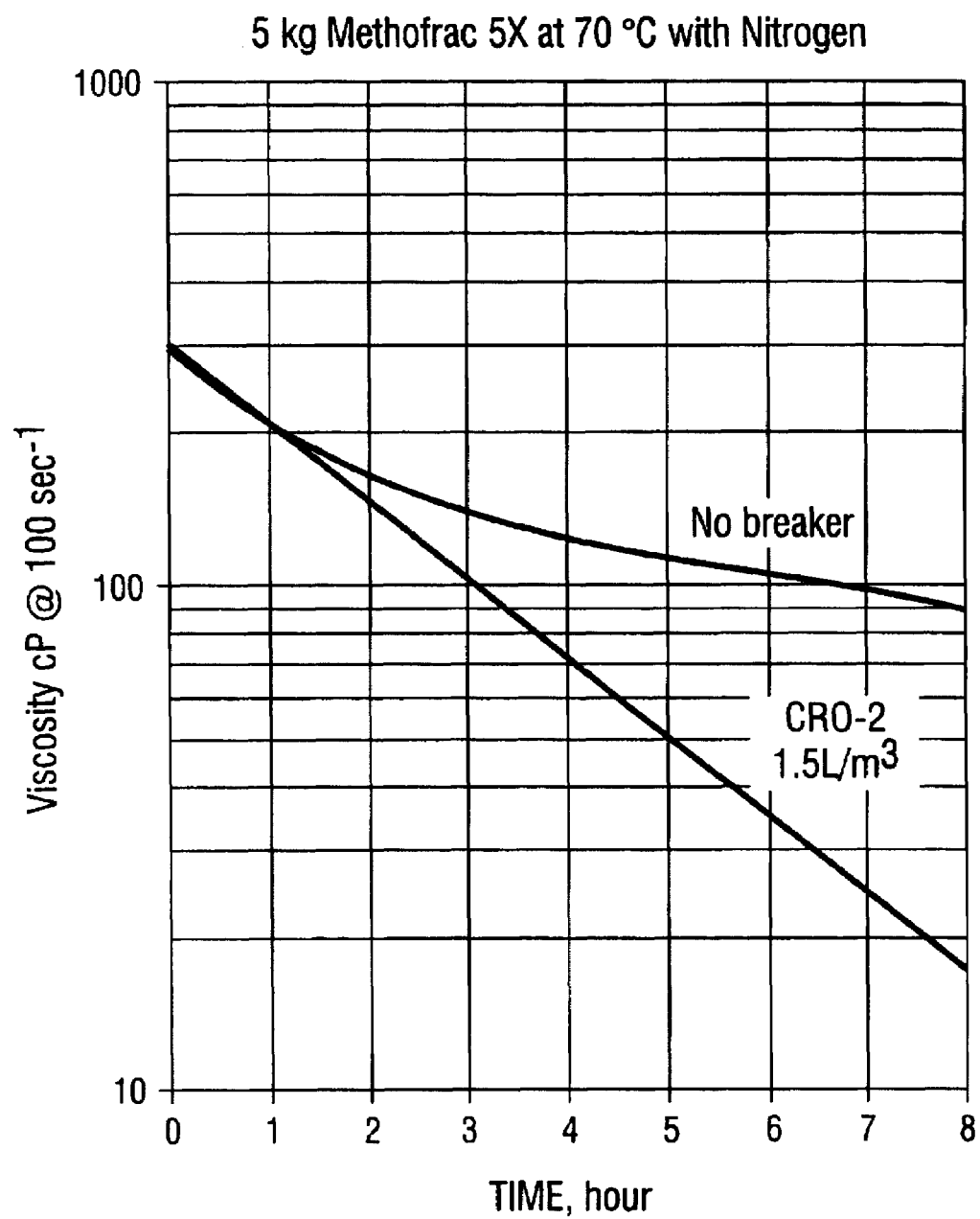

5 kg at 70° C. with Nitrogen (Viscosity, cP @ 100 sec$^{-1}$)(FIG. 4B)

| Time, hr | No breaker | 1.25 l/m³ CRO-2 |
|---|---|---|
| 0 | 309 | 311 |
| 1 | 210 | 218 |
| 2 | 168 | 152 |
| 3 | 143 | 107 |
| 4 | 127 | 75 |
| 5 | 115 | 52 |
| 6 | 105 | 36 |
| 7 | 98 | 26 |
| 8 | 92 | 18 |

Figure 5A:
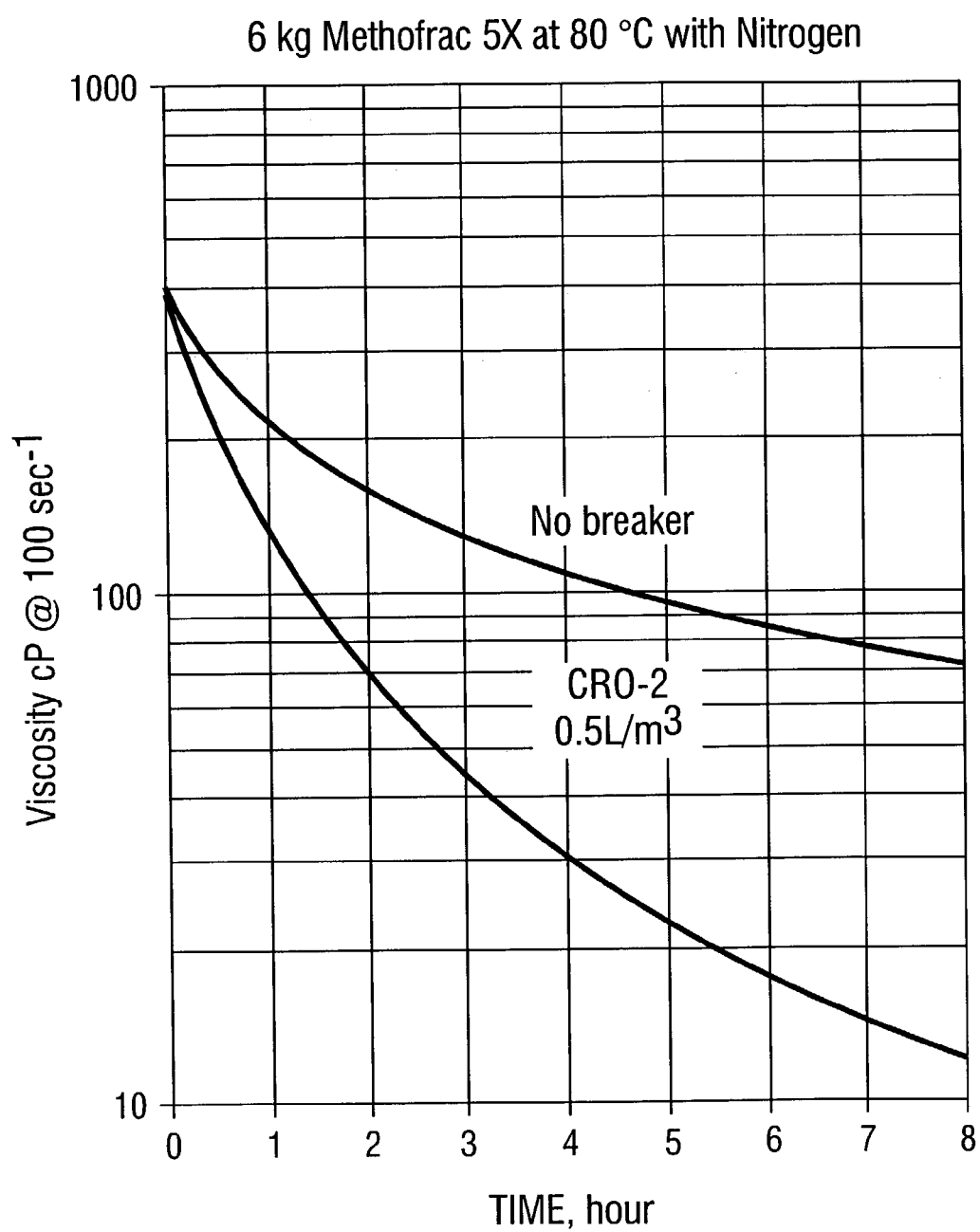

6 kg at 80° C. with Nitrogen (Viscosity, cP @ 100 sec$^{-1}$)(FIG. 5A)

| Time, hr | No breaker | 1.5 l/m³ CRO-2 |
|---|---|---|
| 0 | 398 | 425 |
| 1 | 232 | 142 |
| 2 | 170 | 73 |
| 3 | 136 | 45 |
| 4 | 114 | 31 |
| 5 |  | 23 |
| 6 |  | 18 |
| 7 |  | 14 |
| 8 |  | 12 |

Figure 5B:
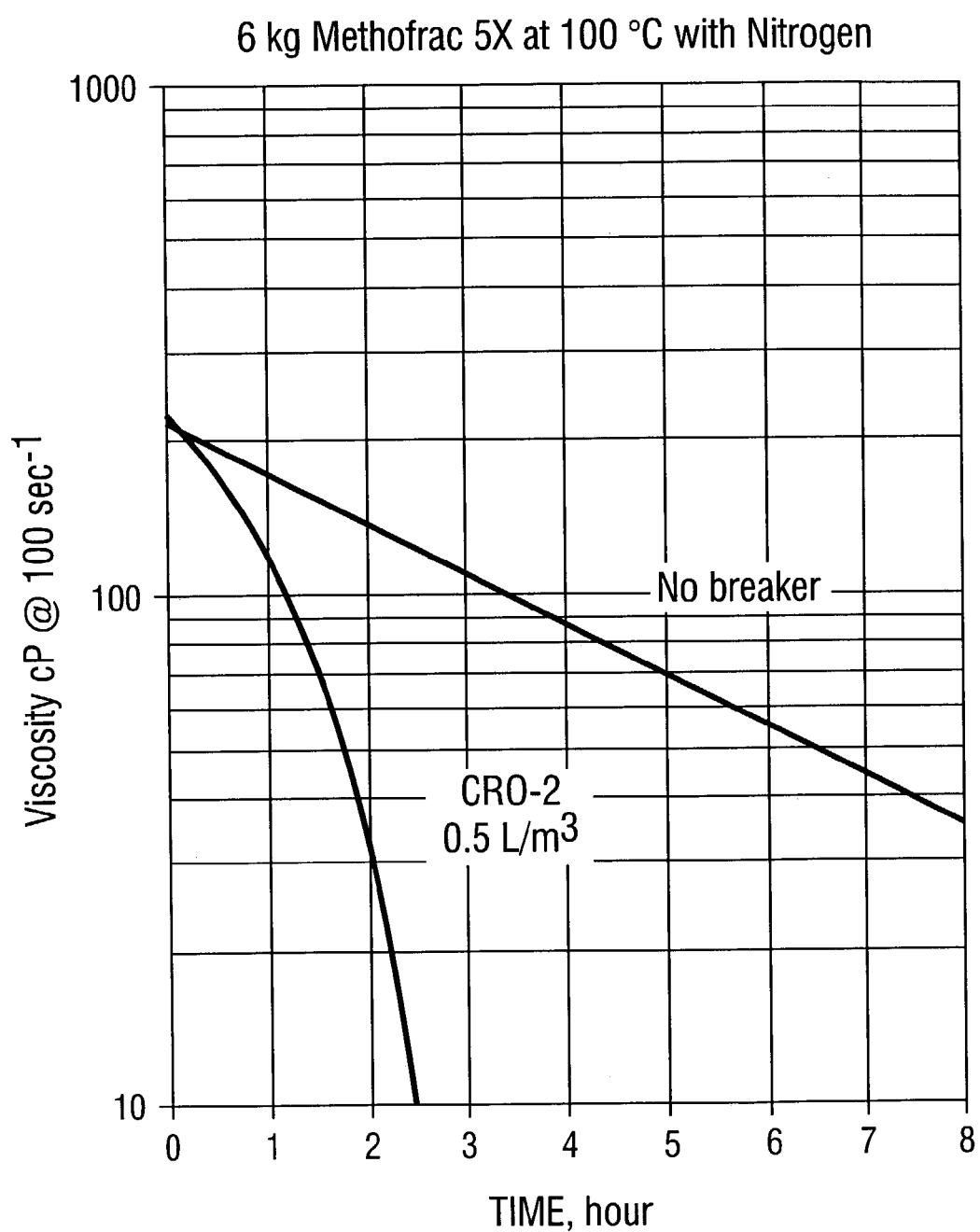

6 kg at 100° C. with Nitrogen (Viscosity, cP @ 100 sec$^{-1}$)(FIG. 5B)

| Time, hr | No breaker | 0.5 l/m³ CRO-2 |
|---|---|---|
| 0 | 229 | 240 |
| 1 | 181 | 133 |
| 2 | 143 | 32 |
| 3 | 113 | 1 |
| 4 | 89 |  |
| 5 | 71 |  |
| 6 | 56 |  |
| 7 | 44 |  |
| 8 | 35 |  |

Figure 5C:
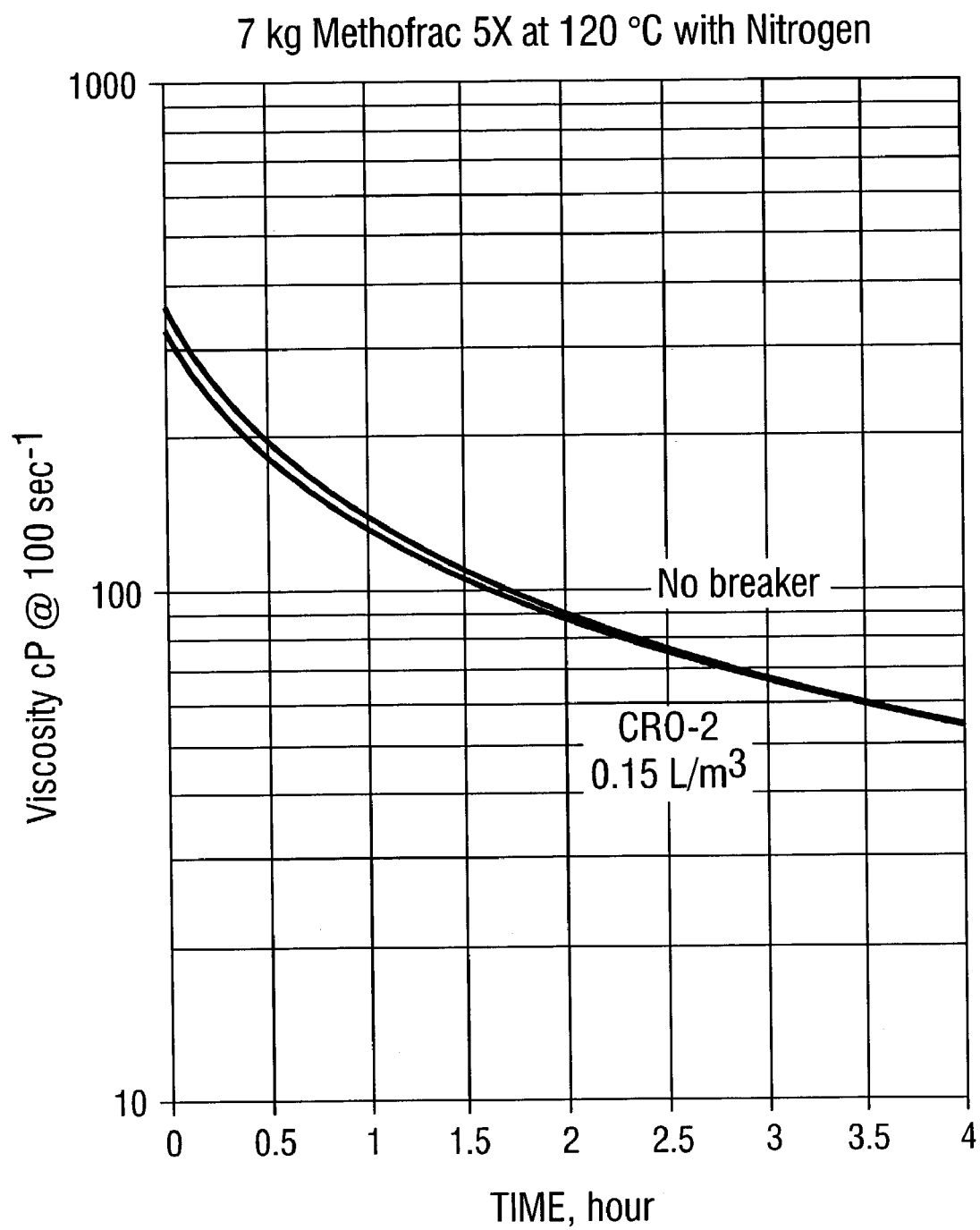

7 kg at 120° C. with Nitrogen (Viscosity, cP @ 100 sec$^{-1}$)(FIG. 5C)

| Time, hr | No breaker | 0.15 l/m³ CRO-2 |
|---|---|---|
| 0 | 364 | 325 |
| 0.5 | 198 | 186 |
| 1 | 139 | 134 |
| 1.5 | 108 | 106 |
| 2 | 89 | 89 |
| 2.5 | 76 | 76 |
| 3 | 66 | 67 |
| 3.5 | 59 | 61 |
| 4 | 53 | 55 |

Example 9

Rheology Assays for Compositions with Carbon Dioxide ($CO_2$)

FIGS. 6 through 8 show similar results obtained when pressurized with carbon dioxide. The formulations of the gels used are described in Example 6. Viscosities were measured using a Brookfield PVT high pressure high temperature rheometer at a continuous shear rate of 100 sec$^{-1}$.

Figure 6A:
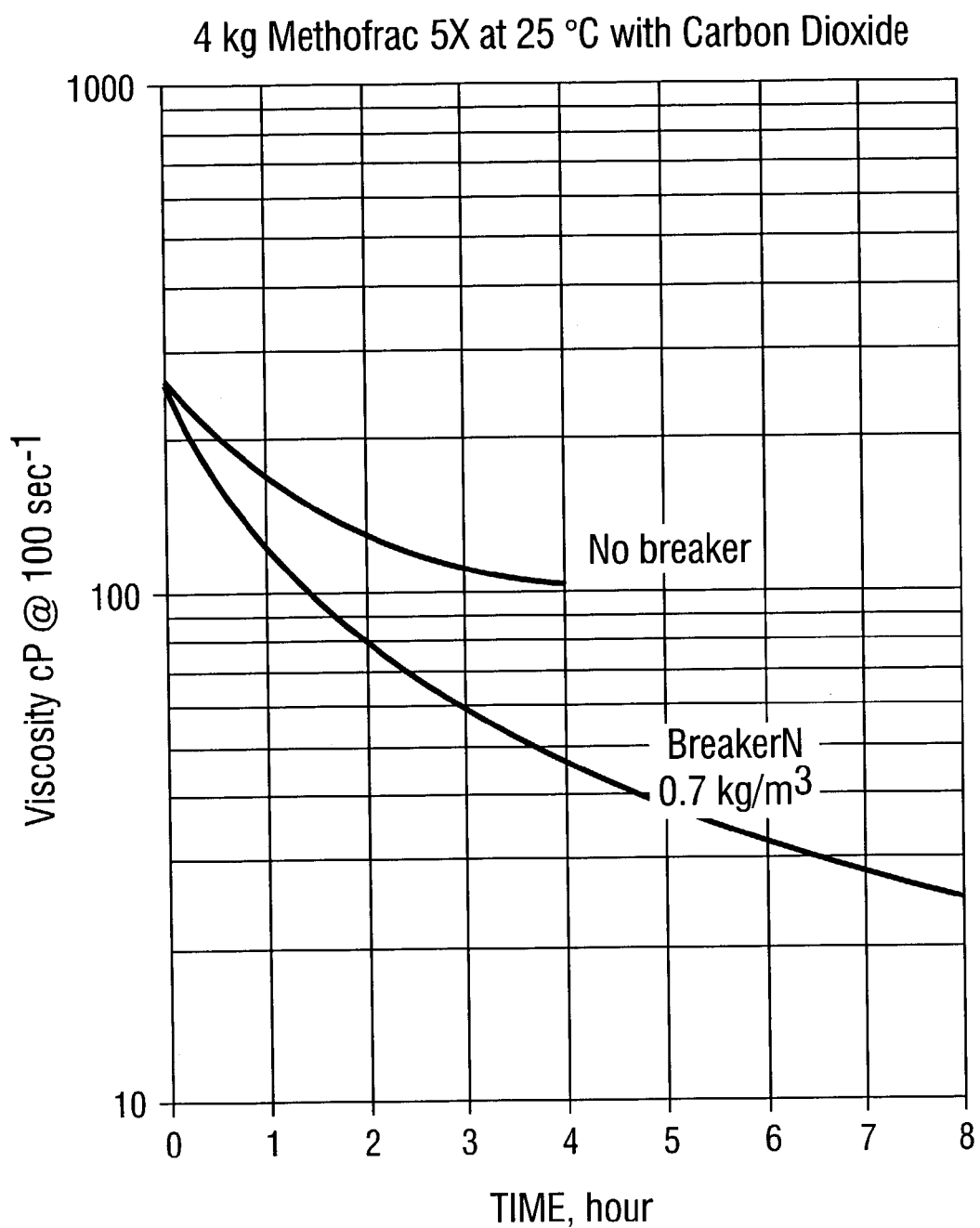

4 kg at 25° C. with Carbon Dioxide (Viscosity, cP @ 100 sec$^{-1}$)(FIG. 6A)

| Time, hr | No breaker | 0.7 l/m3 BreakerN |
|---|---|---|
| 0 | 278 | 277 |
| 1 | 177 | 130 |
| 2 | 133 | 83 |
| 3 | 115 | 61 |
| 4 | 105 | 48 |
| 5 |  | 39 |
| 6 |  | 33 |
| 7 |  | 29 |
| 8 |  | 25 |

Figure 6B:
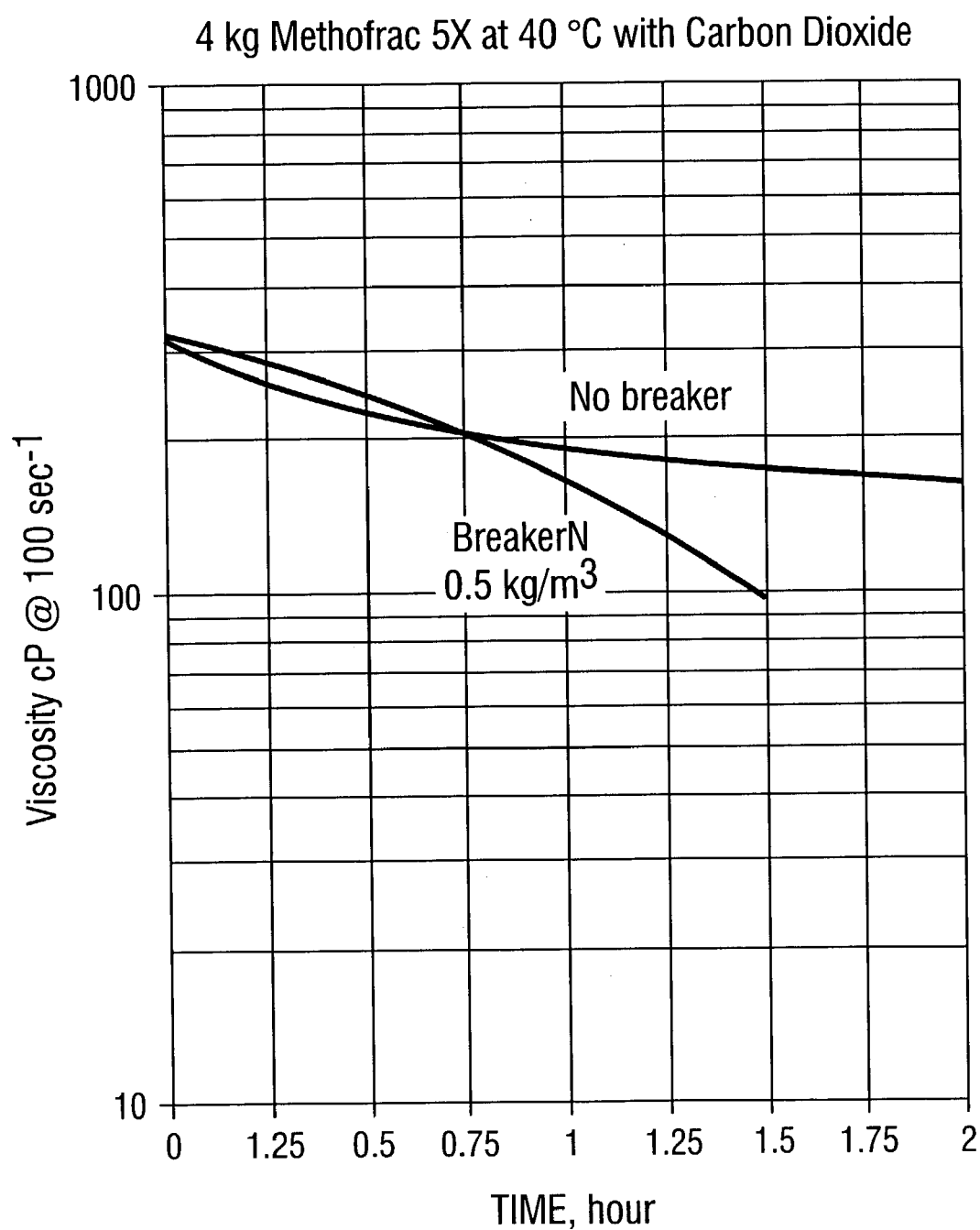

4 kg at 40° C. with Carbon Dioxide (Viscosity, cP @ 100 sec$^{-1}$)(FIG. 6B)

| Time, hr | No breaker | 0.5 kg/m³ BreakerN |
|---|---|---|
| 0 | 318 | 321 |
| 0.25 | 257 | 283 |
| 0.5 | 227 | 246 |
| 0.75 | 207 | 209 |
| 1 | 194 | 171 |
| 1.25 | 183 | 134 |
| 1.5 | 174 | 96 |
| 1.75 | 167 | — |
| 2 | 161 | — |

Figure 6C:
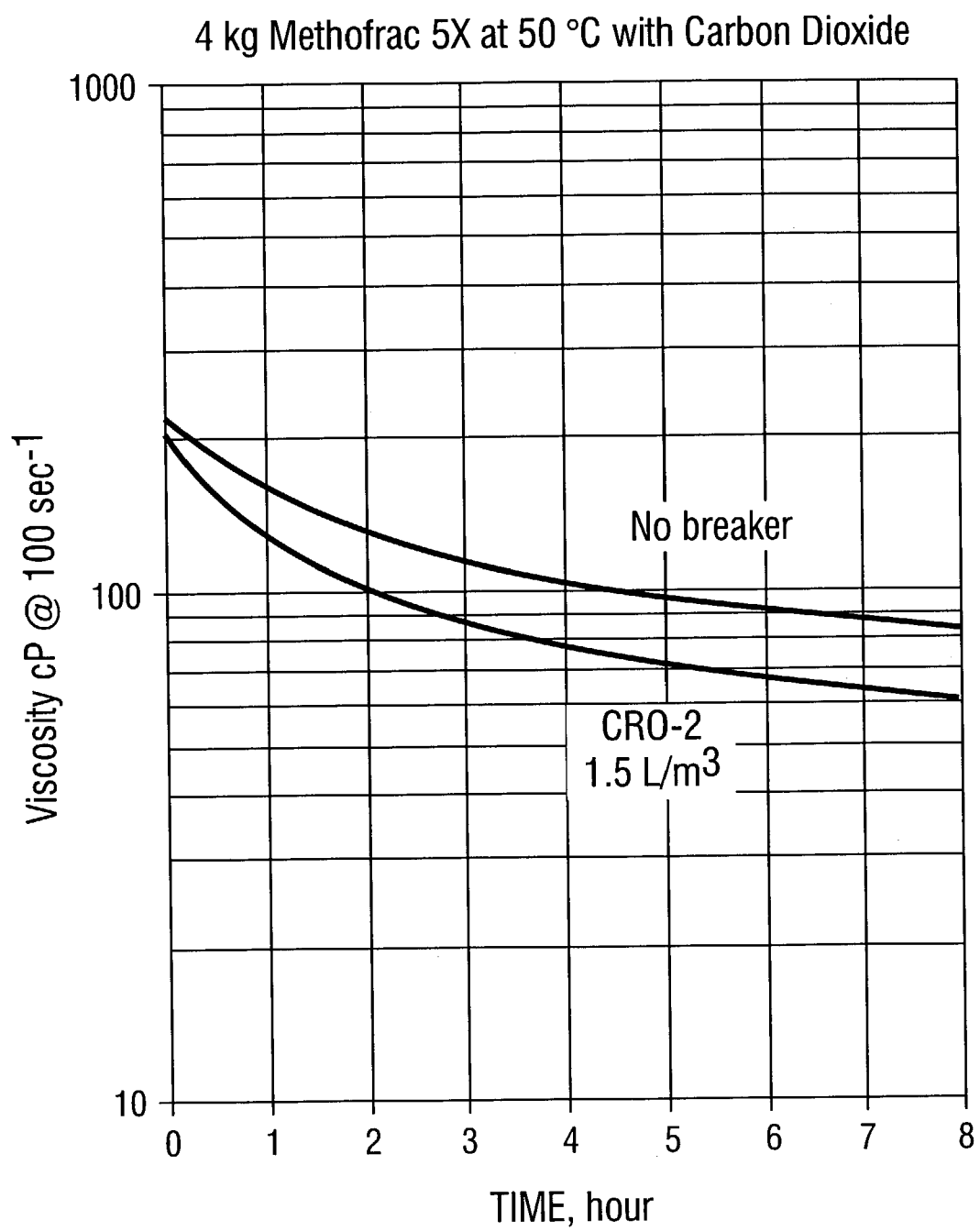

4 kg at 50° C. with Carbon Dioxide (Viscosity, cP @ 100 sec$^{-1}$)(FIG. 6C)

| Time, hr | No breaker | 1.5 l/m³ CRO-2 |
|---|---|---|
| 0 | 221 | 205 |
| 1 | 158 | 129 |
| 2 | 131 | 101 |
| 3 | 112 | 86 |
| 4 | 104 | 78 |
| 5 | 97 | 72 |
| 6 | 92 | 67 |
| 7 | 86 | 63 |
| 8 | 82 | 61 |

Figure 7A:
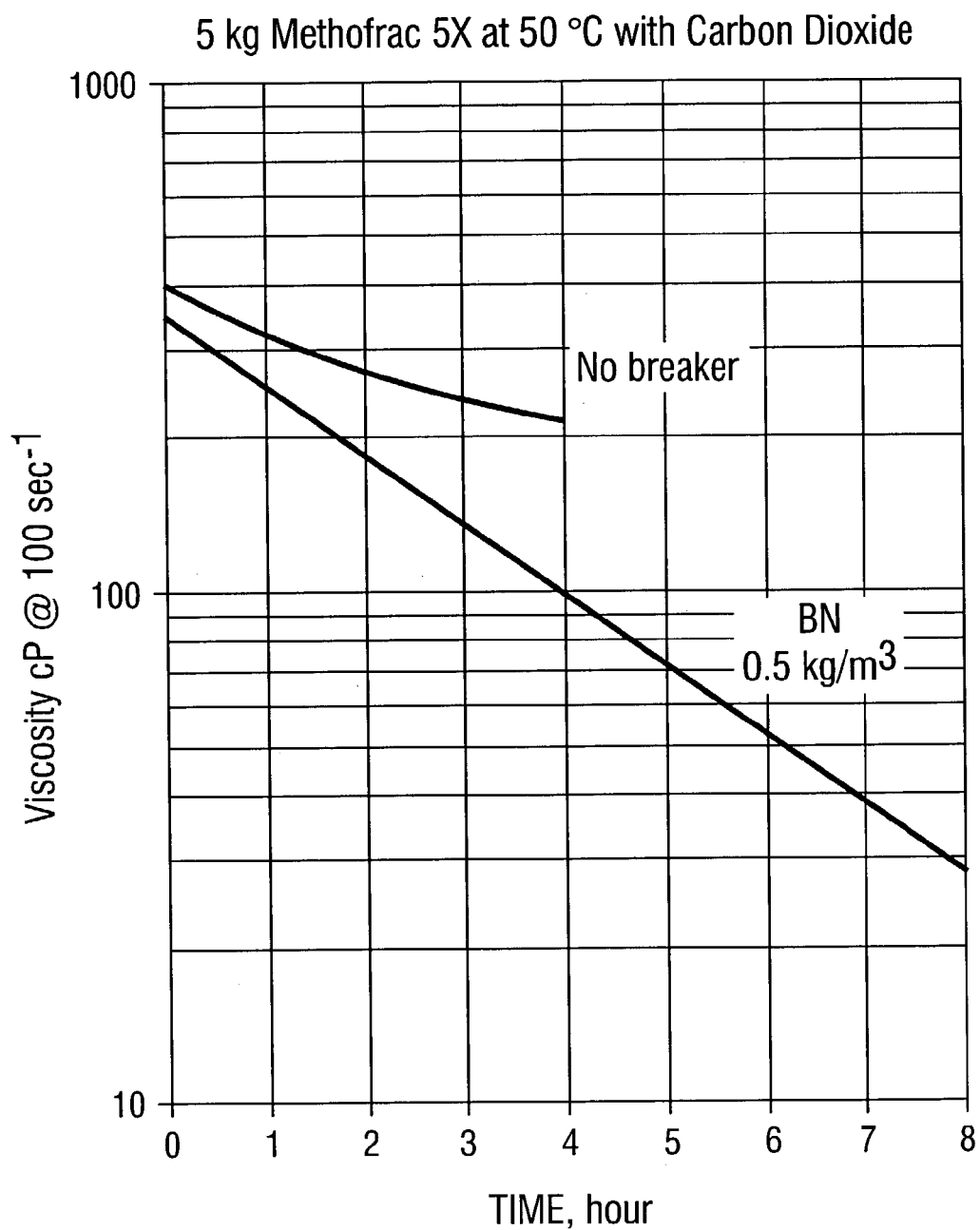

5 kg at 50° C. with Carbon Dioxide (Viscosity, cP @ 100 sec$^{-1}$)(FIG. 7A)

| Time, hr | No breaker | 0.5 kg/m³ BreakerN |
|---|---|---|
| 0 | 409 | 351 |
| 1 | 324 | 255 |
| 2 | 270 | 185 |
| 3 | 238 | 134 |
| 4 | 216 | 97 |
| 5 | 0 | 71 |
| 6 | 0 | 51 |
| 7 | 0 | 37 |
| 8 | 0 | 27 |

Figure 7B:
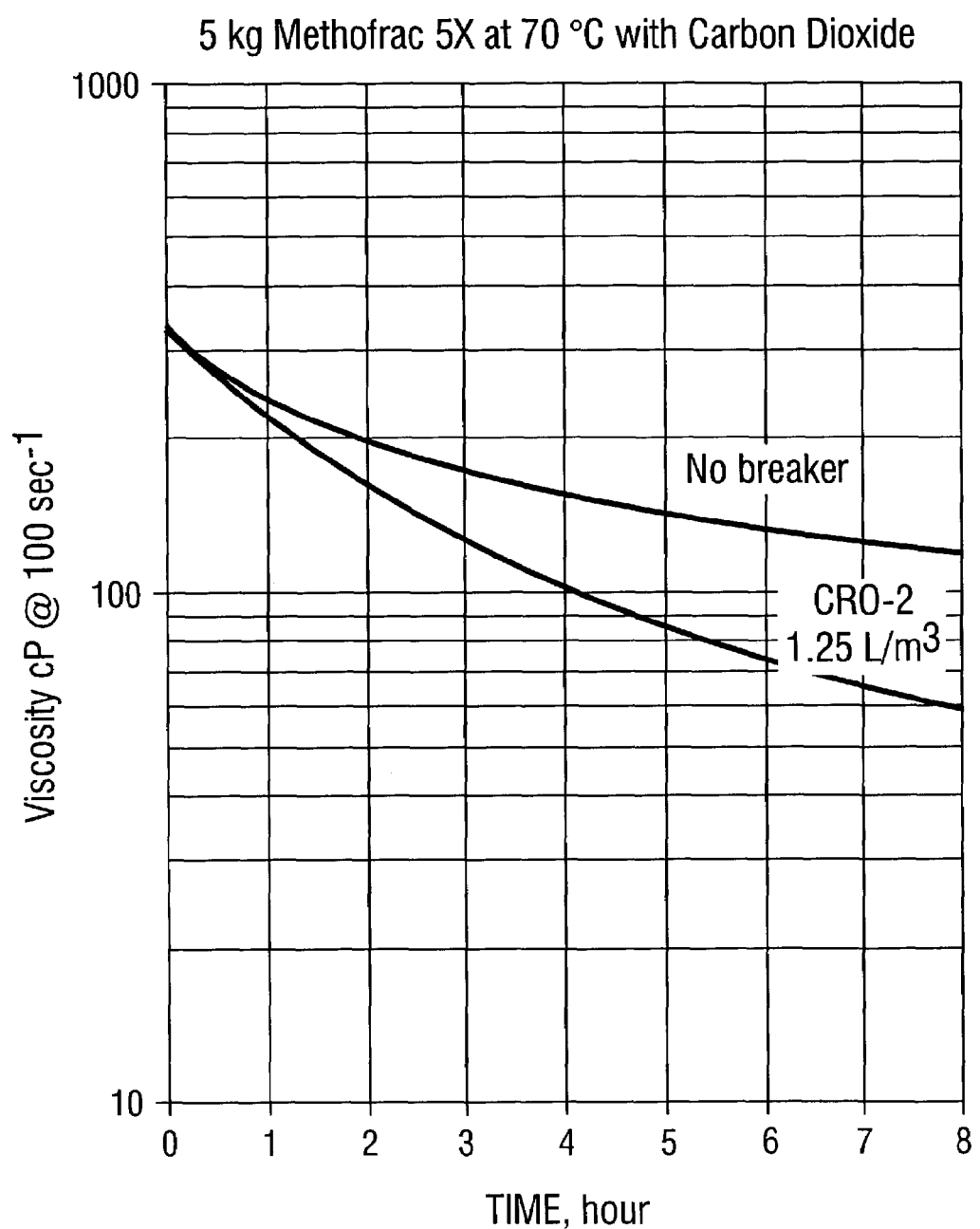

5 kg at 70° C. with Carbon Dioxide (Viscosity, cP @ 100 sec$^{-1}$)(FIG. 7B)

| Time, hr | No breaker | 1.25 l/m³ CRO-2 |
|---|---|---|
| 0 | 339 | 358 |
| 1 | 246 | 231 |
| 2 | 204 | 171 |
| 3 | 179 | 130 |
| 4 | 162 | 107 |
| 5 | 149 | 86 |
| 6 | 138 | 74 |
| 7 | 130 | 65 |
| 8 | 123 | 60 |

Figure 8A:
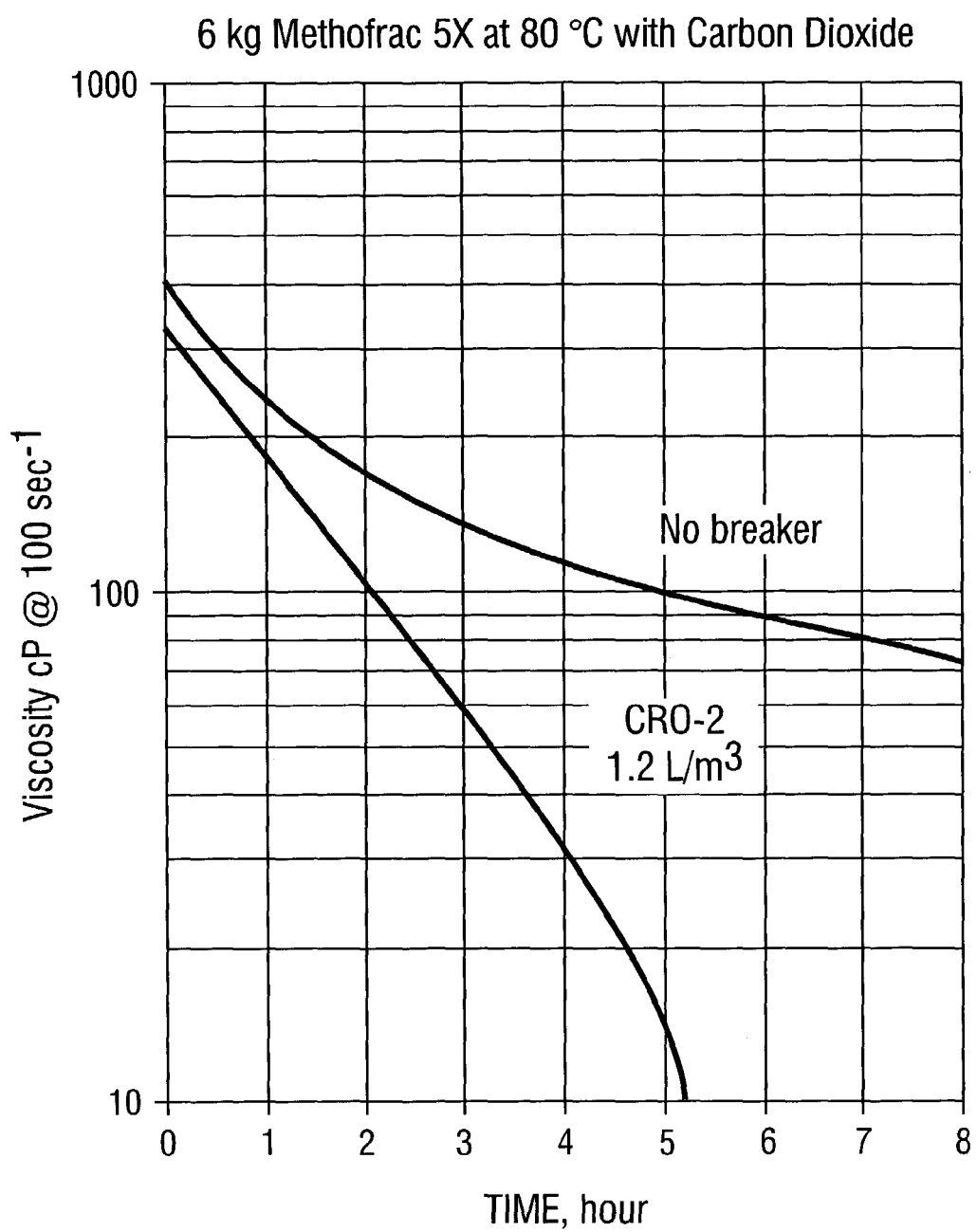

6 kg at 80° C. with Carbon Dioxide (Viscosity, cP @ 100 sec$^{-1}$)(FIG. 8A)

| Time, hr | No breaker | 1.2 l/m³ CRO-2 |
|---|---|---|
| 0 | 418 | 331 |
| 1 | 240 | 192 |
| 2 | 174 | 104 |
| 3 | 138 | 55 |
| 4 | 115 | 31 |
| 5 | 100 | 13 |
| 6 | 88 | 0 |
| 7 | 79 | |
| 8 | 72 | |

Figure 8B:
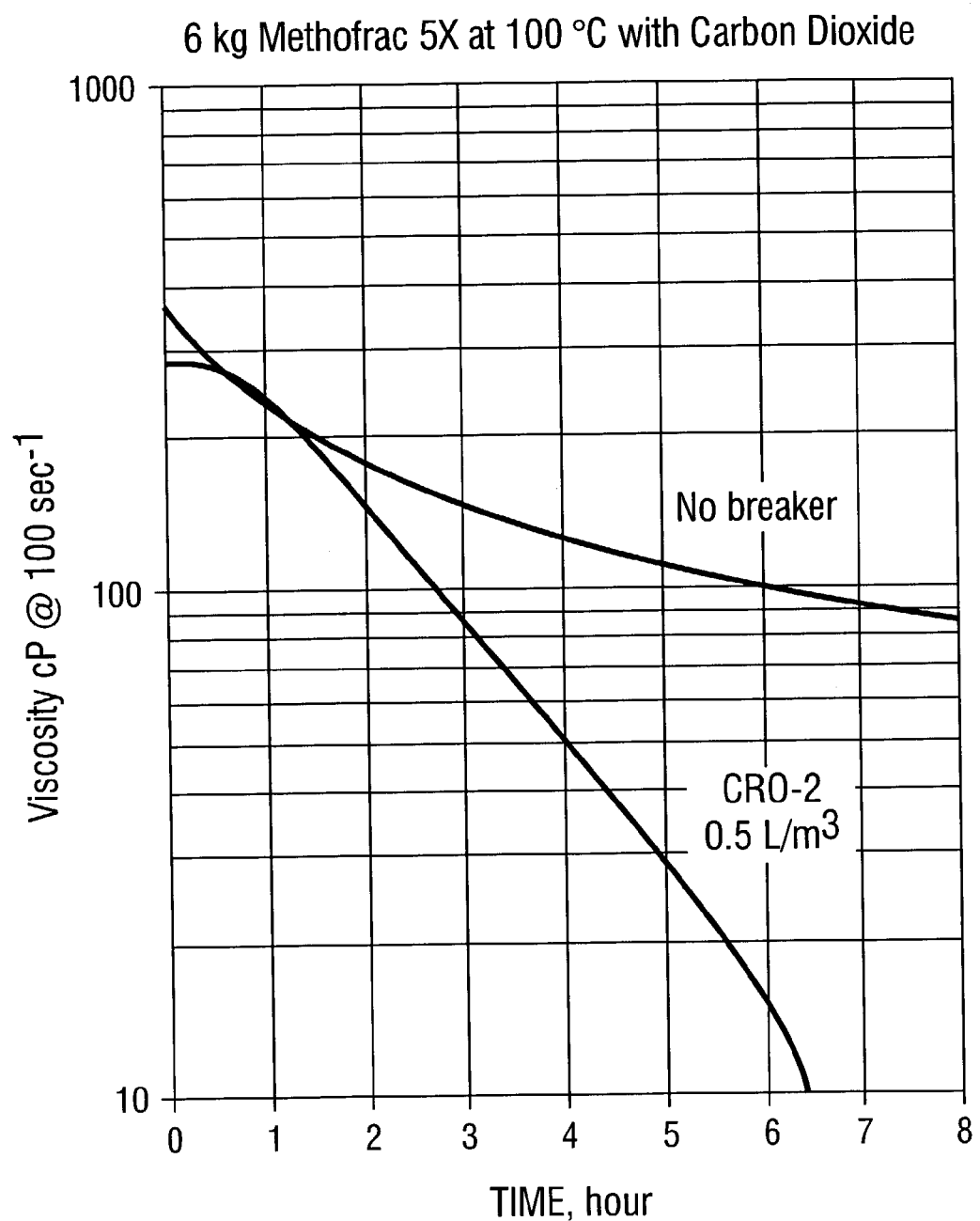

6 kg at 100° C. with Carbon Dioxide (Viscosity, cP @ 100 sec$^{-1}$)(FIG. 8B)

| Time, hr | No breaker | 0.5 l/m³ CRO-2 |
|---|---|---|
| 0 | 385 | 286 |
| 1 | 240 | 250 |
| 2 | 183 | 153 |
| 3 | 150 | 92 |
| 4 | 129 | 53 |
| 5 | 114 | 29 |
| 6 | 103 | 15 |
| 7 | 94 | 5 |
| 8 | 87 | 1 |

Figure 8C:
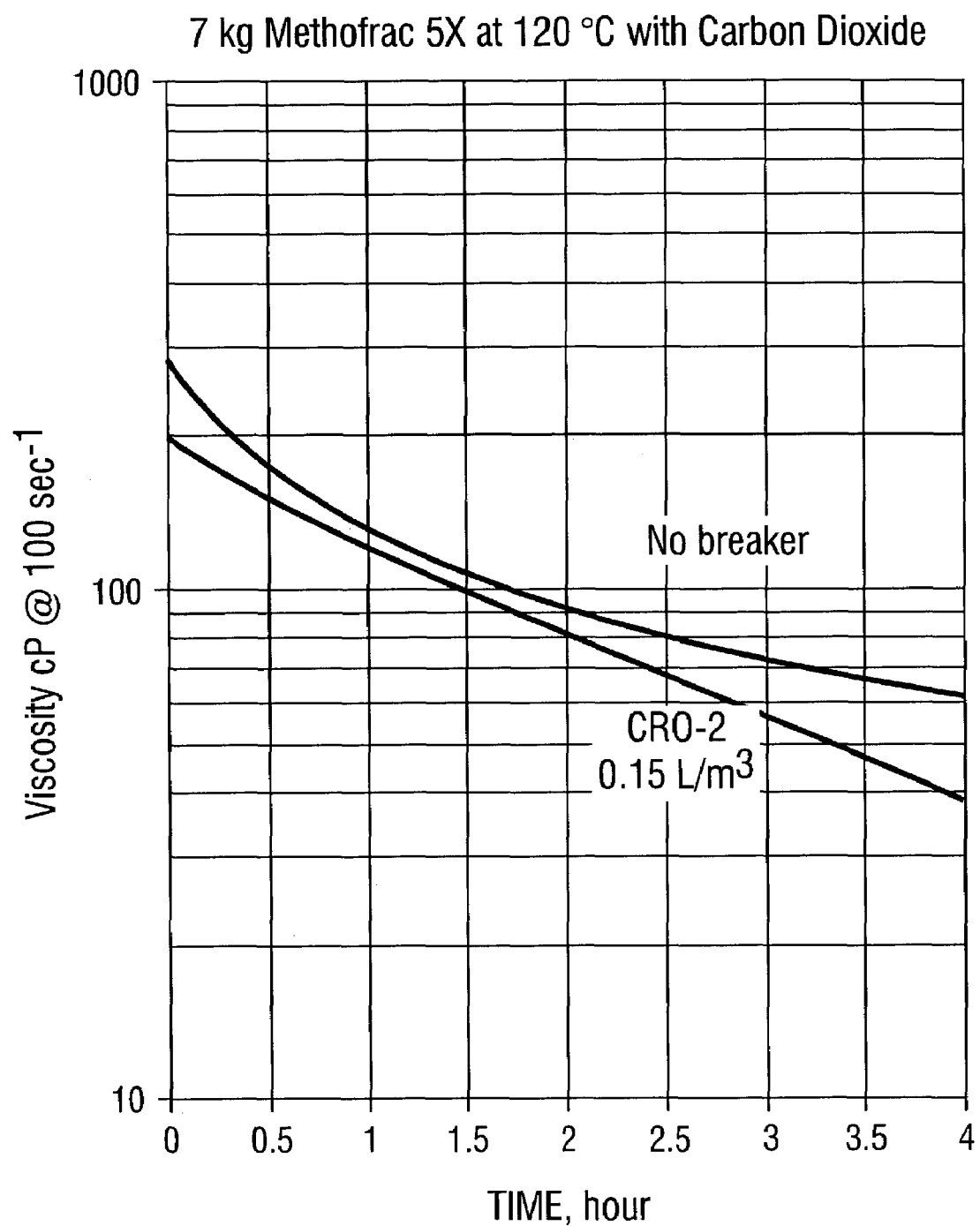

7 kg at 120° C. with Carbon Dioxide (Viscosity, cP @ 100 sec$^{-1}$)(FIG. 8C)

| Time, hr | No breaker | 0.0 l/m³ CRO-2 |
|---|---|---|
| 0 | 296 | 208 |
| 0.5 | 180 | 154 |
| 1 | 135 | 123 |
| 1.5 | 109 | 101 |
| 2 | 93 | 84 |
| 2.5 | 82 | 70 |
| 3 | 73 | 58 |
| 3.5 | 67 | 48 |
| 4 | 61 | 38 |

Example 10

Viscosity Assays

The base gel is formed by completely hydrating the polymer in non-aqueous methanol. The viscosity is measured in a Fann 35 rheometer at ambient conditions at 511 sec$^{-1}$. This measurement gives the yield of the new polymer at various loadings and also can be used as a quality control measurement.

Viscosity of Base Gel at 25° C.

| Base Gel | Viscosity at 511 sec$^{-1}$ |
|---|---|
| 4 kg/m³ | 7.5 cP |
| 5 kg/m³ | 10.0 cP |
| 6 kg/m³ | 14.0 cP |
| 7 kg/m³ | 16.5 cP |

It is understood by those skilled in the art that a minimum viscosity is used in fracturing applications based upon well conditions, and typically is about 80 cP to about 100 cP. For example, the formulation shown above can be used for a fracturing treatment lasting slightly over 3 hours.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the methods described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the scope and concept of the invention.

What is claimed is:

1. A method of treating a downhole well formation, the method comprising:
   providing a composition comprising hydroxypropyl guar polymer with a molar substitution of about 1.2 to about 2.2 dissolved in an alcohol solvent, a zirconium crosslinker or titanium crosslinker, and a breaker;
   pumping the composition into a wellbore; and
   contacting the composition and the formation.

2. The method of claim 1, wherein the composition further comprises nitrogen gas, liquid carbon dioxide, or supercritical carbon dioxide.

3. The method of claim 1, wherein the alcohol solvent is methanol, ethanol, 2-propanol, 1-butanol, or 2-butanol.

4. The method of claim 1, wherein the breaker is a percarbonate, a perchlorate; a peracid, or a peroxide.

5. The method of claim 1, wherein the breaker is sodium persulfate or encapsulated potassium persulfate.

6. The method of claim 1, further comprising removing the composition from the formation after the contacting step.

7. The method of claim 6, wherein the contacting and removing steps remove water from the formation.

8. The method of claim 1, wherein the contacting step dissolves polymer materials that were present in the formation.

9. The method of claim 1, wherein the composition further comprises a proppant.

10. The method of claim 1, wherein the composition further comprises sand, ceramic particles, or a resin coated particle.

11. The method of claim 1, wherein the wellbore is an oil well wellbore.

12. The method of claim 1, wherein the wellbore is a gas well wellbore.

13. A method of treating a downhole well formation, the method comprising:
    providing a composition comprising hydroxypropyl guar polymer with a molar substitution of about 1.2 to about 2.2, an alcohol solvent, a zirconium crosslinker or titanium crosslinker, carbon dioxide that is either liquid or supercritical, and a breaker;
    pumping the composition into a weilbore; and
    contacting the composition and the formation.

14. The method of claim 13, wherein the carbon dioxide is liquid carbon dioxide.

15. The method of claim 13, wherein the carbon dioxide is supercritical carbon dioxide.

16. The method of claim 1, wherein the composition contains less than 5 weight percent water.

* * * * *

UNITED STATES PATENT AND TRADEMARK OFFICE
CERTIFICATE OF CORRECTION

PATENT NO. : 7,049,436 B2 Page 1 of 1
APPLICATION NO. : 10/267686
DATED : May 23, 2006
INVENTOR(S) : Gupta et al.

It is certified that error appears in the above-identified patent and that said Letters Patent is hereby corrected as shown below:

Claim 4, Column 13, line 18, delete ";" and insert --,--.

Claim 13, Column 14, line 17, cancel "weilbore" and insert --wellbore--.

Signed and Sealed this

Twenty-ninth Day of August, 2006

JON W. DUDAS
*Director of the United States Patent and Trademark Office*